May 6, 1958    I. M. WELLS ET AL    2,833,187
ROAD PATCHING MACHINE
Filed Nov. 1, 1954
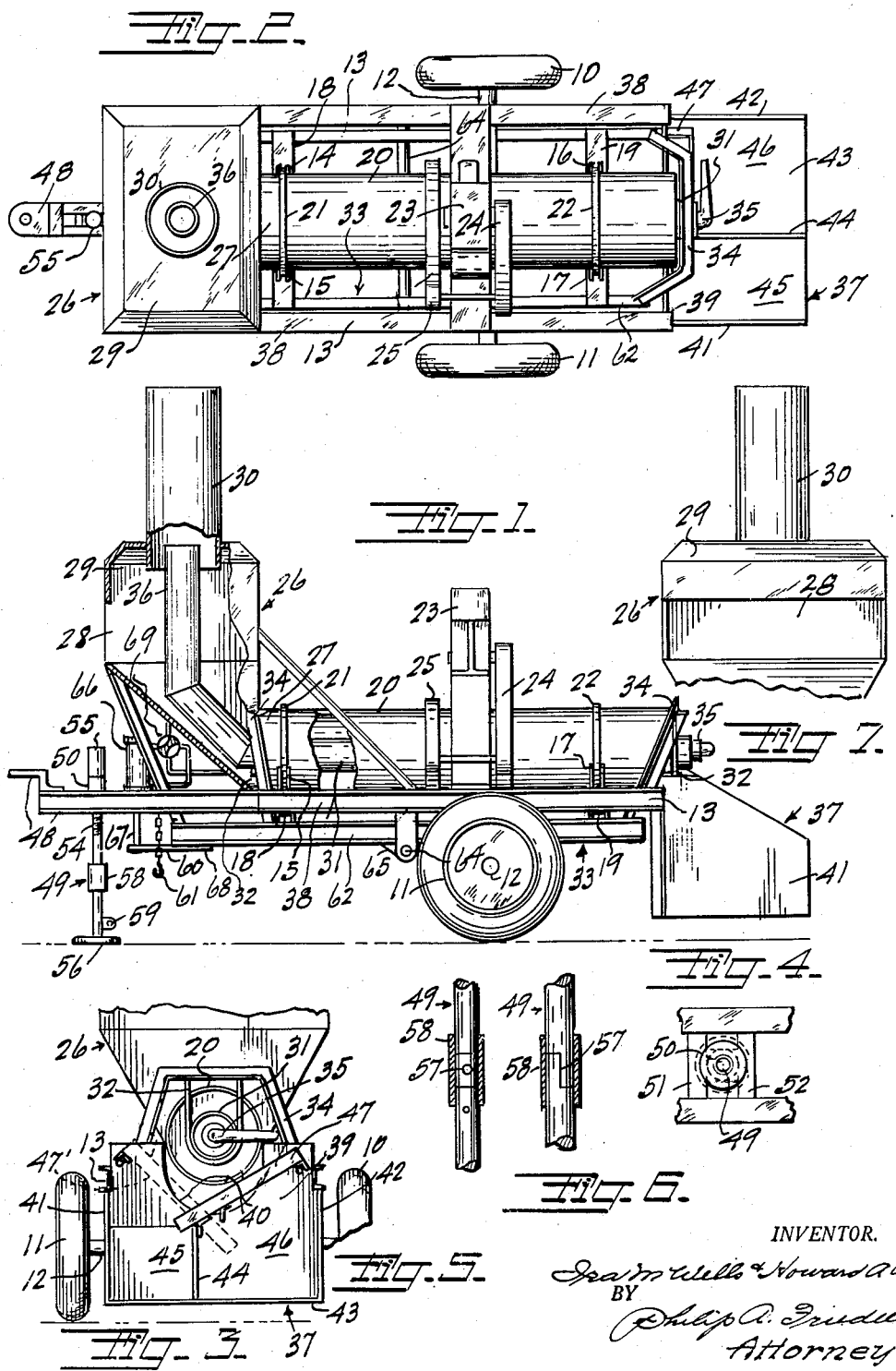

United States Patent Office 2,833,187
Patented May 6, 1958

2,833,187

ROAD PATCHING MACHINE

Ira M. Wells and Howard A. Olds, Oakland, Calif.

Application November 1, 1954, Serial No. 465,828

6 Claims. (Cl. 94—42)

This invention relates to improvements in machines for preparing patching material for patching streets and highways, and which provides a machine which heats to proper applying temperature, solidified stock pile patch material ready for use at the point where any patch is to be applied, a machine which is relatively compact and light in weight for convenient and easy moving from one point to another, and which can be coupled onto any suitable automotive vehicle, though preferably to a light maintenace truck carrying a suitable supply of stock piled asphaltic mix for applying patches to a relatively great number of chuck holes and irregular surfaces existing over a relatively large area, for convenience and relative ease of patching, and to expedite the work.

This machine is also adapted to selectively heat and dry sand for cover after the patch has been applied, and includes a heating drum which is rotatably and tiltably mounted on a vehicle of the trailer type, the drum being adjustable as to pitch to control the rate of travel of the material through the heating drum for controlling the specific degree of heating without varying the adjustment of the heating means which as is illustrated consists of a fuel burner fed by any suitable liquid or gaseous fuel, and heating the contents of the heating drum through a coaxial flue, with the products of combustion discharging through an ejection stack which passes upwardly through the feed hopper for discharge of any gases in the feed hopper through the stack, and coincidently pre-heating the material in the feed hopper for more uniform feeding into the heating drum.

With this arrangement the fire is confined to the flue and completely isolated from the material in the heating drum, therefore an inflammable cut-back material can be processed practically free of danger of flash-backs, and the ejection stack discharges any gases from the hopper out through the stack to maintain the air breathed by the person shoveling the material into the hopper free of contamination. A two-compartment discharge hopper is also provided for selective heating of asphaltic mix, and cover sand.

The objects and advantages of the invention are as follows:

First, to provide an easily portable machine for heating stock piled asphaltic mix patch material on location to a proper temperature for application to a road for patching purposes.

Second, to provide a machine as outlined which is readily coupled to a truck serving as the source of supply of the patch material and cover sand.

Third, to provide a machine as outlined with a rotatable and adjustably tiltable heating drum to control the output and degree of heating of the patch material without resorting to any adjustment of the heating means.

Fourth, to provide a machine as outlined with a rotatable heating drum provided with a fixed coaxial fire flue to isolate the material being heated in the heating drum from the flame.

Fifth, to provide a machine as outlined with a feed hopper having a gas entrapment canopy with an ejection stack passing upwardly therethrough to discharge entrapped gases through the stack and prevent their exit through the hopper supply inlet.

Sixth, to provide a machine as outlined with a two-compartment discharge hopper for selective heating and discharge of asphaltic mix, and sand for topping the patches.

In describing the invention reference will be had to the accompanying drawings, in which:

Fig. 1 is a side elevation of the invention partly shown in section.

Fig. 2 is a top plan view of Fig. 1.

Fig. 3 is a fragmentary end elevation showing the two-compartment discharge hopper, and the fixed support for the coaxial fire flue.

Fig. 4 is a fragmentary view of a portion of the front end of the main frame showing the jackleg adjusting means.

Fig. 5 is a fragmentary view of the knee of the jackleg with the locking sleeve shown in section.

Fig. 6 is a side elevation of Fig. 5 clearly showing the hinge joint.

Fig. 7 is a fragmentary view showing the intake end of the feed hopper with canopy.

The invention consists of a wheeled vehicle such as the two-wheeled trailer shown and which includes two road wheels 10 and 11 mounted on an axle 12 on which a main frame 13 is supported. Rollers 14, 15, 16 and 17 are supported on cross members 18 and 19 of a tilting frame which is supported by the main frame.

A heating drum 20 has spaced annular rails 21 and 22 respectively riding in the rollers 14 and 15, and 16 and 17, and is rotatably driven by a prime mover such as an internal combustion motor 23 through the drive 24, 25.

A feed hopper 26 feeds material into the front or feed end 27 of the drum, and extends upwardly, having an entrance 28 through the front wall for delivery of material into the hopper, and extends upwardly from the top edge of this opening to form a canopy 29 for entrapment of gases issuing from the front end of the drum as also from the material fed into the hopper, and a stack 30 extends upwardly from this canopy and opens into the canopy centrally of the top.

A fire flue 31 extends axially through the heating drum and is fixedly supported at its opposite ends by cradles 32 at the respective ends, and which are in turn supported by the brackets 34 which are fixed to and supported by the tilting frame 33.

The fire flue is provided with a suitable burner 35 at the rear or discharge end, and a stack 36 is fixed to the forward or feed end, and is of lesser diameter than the main stack 30, and extends part way up inside the lower end of the main stack to function as an injector to carry the fumes and gases from inside of the hopper and canopy and discharge them to atmosphere through the main stack, thus preventing escape of the gases and fumes out through the feed opening 28 to maintain the air in front of the hopper free of these fumes and gases while a person is delivering the asphaltic mix into the hopper for processing.

The discharge hopper 37 is supported by the main frame through its side members 38, and the front wall 39 of this hopper is recessed as indicated at 40 to clear the discharge end of the heating drum with maximum downward tilt for maximum rate of feed of processed material. This discharge hopper has side walls 41 and 42, and a bottom wall 43, and is divided into two compartments by a partition 44 to form a sand compartment 45, and a patch material compartment 46, and a trough 47 is transferable to two positions, as indicated at 47 to deliver dried and heated sand topping from the heating drum to the sand hopper 45, and as indicated by the dotted position 47' for delivering heated patch material to the compartment 46.

The vehicle is provided with a trailer hitch 48 which is fixed to the forward end of the main frame, and a jackleg 49 adjustably cooperates with the forward end of this main frame for adjusting the main frame to a level position if desired to maintain the slope adjustment of the heating drum, and coincidently providing a support for the front end of the vehicle, and is shown as including a nut 50 mounted in the forward portion of the main frame and supported between cross-members 51 and 52, the upper end of the jackleg being threaded as indicated at 54 to fit this nut. A cap 55 is provided to protect the protruding upper end of the jackleg from dust, sand and patch material, and the jackleg may be adjusted by any suitable means. The jackleg is provided with a foot 56 and is intermediately hinged as indicated at 57 and provided with a locking and reinforcing sleeve 58 which is slid up when the jackleg is to be folded when the vehicle is to be moved or towed, and allowed to slide down when the jackleg is straightened for support of the front end of the vehicle, the jackleg having means such as an eye 59 for supporting the lower end through the medium of the chain 60 which terminates in a hook 61 for hooking into this eye, thus requiring no readjustment when the machine is moved to another patching position unless the slope of the road changes, in which case it may be desirable to change the adjustment of the leg.

The tilting frame includes side members 62 and 63 and the cross members 18 and 19 on which the rollers for the heating drum are mounted, and is mounted within the confines of the main frame on a shaft 64 which is supported by drop members 65 on the main frame, and suitable slope adjusting means is provided and shown as a fluid motor 66 which is mounted on the main frame and has a piston rod 67 which has connection with an extension 68 on the front end of the tilting frame, this fluid motor being controlled by suitable means as indicated at 69.

When a road patching job is to be done, the tow truck is loaded with a suitable supply of the asphaltic mix and a supply of sand. The road patching machine is then coupled onto the truck and transported to the location where the patching is to be done, the burner being started at the proper time to be ready for processing the material when that location is reached, at which time the prime mover is started for rotating the heating drum.

The tilting frame, and with it the heating drum, can be adjusted at any time as to pitch and consequently the output and degree of heating, either before or during the processing of the material through the medium of the fluid motor 66—67 and its control 69. If the road is level it will not be necessary to readjust the pitch of the heating drum as the unit is moved from one patching position to another. If for any reason the road patching machine is to be uncoupled from the truck, the jacklag is released and coupled to support the front end of the unit.

Sand is first shoveled into the feed hopper and discharges into the compartment 45. After sufficient sand has been dried and heated, the asphaltic mix is shoveled into the feed hopper and is discharged into the compartment 46, the trough 47 having been transferred to the dotted position. Since the sand is used only for topping, a predetermined supply will suffice for a great amount of patching, and a single run of sand will probably be sufficient for hours of patching.

We claim:

1. A road patching machine comprising a vehicle having a pair of wheels and an axle, a main frame supported by said axle, drop members mounted on and dependent from said main frame, a tilting frame pivotally supported by said drop members on a transverse axis in a plane below said main frame and having a feed end and a discharge end, and a heating drum rotatably mounted on said tilting frame, and power means supported above said heating drum and having a driving connection therewith for rotatably driving said heating drum, a fire flue extending axially through said heating drum and having a burner at the discharge end of said heating drum and fixedly supported by said tilting frame and having a fire flue stack extending upwardly from the feed end, and a feed hopper communicating with the feed end of said heating drum and supported by said tilting frame, with said fire flue stack enclosed within said hopper for preheating of patch material in the hopper, said hopper having a stack with said fire flue stack projecting slightly into and annularly spaced from the lower end of the stack for said hopper to form a modified venturi for discharging fumes through the top of said hopper about said flue stack and to atmosphere through said stack for said hopper, and a discharge hopper for the discharge end of said heating drum and supported by said vehicle in receptive relation to the discharge end of said heating drum, a cross member on said main frame and a forwardly extending support member on said tilting frame and adjusting means cooperative between said cross member and said forwardly extending support member for adjusting the slope of said heating drum for varying the rate and degree of processing of patch material.

2. A road patching machine comprising a vehicle having two wheels having an axle, a main frame having a feed end and a discharge end and supported on said axle, drop members on said main frame and located forwardly of said wheels, a transverse shaft connecting said drop members and a tilting frame pivotally supported thereby, a heating drum rotatably mounted on said tilting frame, a support frame supported by said tilting frame and extending about and over said heating drum, and power means for driving said heating drum and supported on said support frame, and a driving connection from said power means to said heating drum, a fire flue extending axially through said heating drum and fixedly supported at its respective ends by said tilting frame, and a burner for said fire flue, a hopper having a feed opening and a discharge opening, a main stack projecting from the top of said hopper, a fire flue stack for said fire flue and projecting upwardly through said hopper and terminating in the lower end of said main stack and annularly spaced therefrom to discharge gases from said hopper, and adjusting means cooperative between said main frame and said tilting frame and comprising a cross member on said main frame and a support projecting forwardly from said tilting frame and adjusting means cooperative between said cross member and said support projecting forwardly for adjusting the inclination of said tilting frame and coincidently the slope of the heating drum for controlling the rate of feed and the degree of heating of material passing through said heating drum.

3. A road patching machine comprising a rotatable heating drum having a fire flue extending axially therethrough and fixed against rotation and having a fire flue stack extending upwardly from one end, and means for rotating said heating drum, a burner for said fire flue, a wheeled vehicle having a frame having said heating drum rotatably supported thereon, a hopper supported by said frame and enclosing said fire flue stack and having a discharge opening communicating with the feed end of said heating drum and having a front wall having a feed opening in the lower portion thereof, said hopper having back and side walls and a top wall to form a canopy in superposed relation to said feed opening and having a main stack projecting upwardly from said top wall and having a cross-sectional area greater than that of said fire flue stack with said fire flue stack having limited projection into the lower end thereof, an annular passage provided between the lower end of said main stack and the upper end of said fire flue stack to function as an injector to discharge fumes from within the hopper and canopy through the annular space between the lower end of the main stack and the upper end of the fire flue stack and out through the main stack and thus prevent escape of fumes through the feed opening, whereby workers delivering material through the feed opening are protected against escape of noxious gases through the feed opening.

4. A structure as defined in claim 2, said heating drum having a discharge end, a hopper for the discharge end of said drum and having back and side walls and a bottom wall, and a partition intermediately located between the side walls for dividing said hopper into two compartments, respectively for dried sand topping for patches and for heated road patching material, and means for diverting discharge from said drum to either compartment at will for segregating the dried sand topping from the heated road patching material as the road patching machine is used selectively for drying sand and for heating road patching material for selective use during road patching operations.

5. A road patching machine comprising, a two wheeled vehicle having a main frame terminating at the forward end in a trailer hitch, a tilting frame pivotally mounted on a transverse shaft in said main frame and in a plane therebelow, a heating drum rotatably mounted on said tilting frame, a prime mover supported by said tilting frame and having a driving connection for rotating said heating drum, a feed hopper mounted at the front end of said tilting frame and communicating with the front end of said heating drum and having a front wall provided with a feed opening in the lower portion thereof, said hopper having side walls and a back wall, and a top wall forming a canopy above said feed opening, and a main stack communicating with said canopy through said top wall, a fire flue extending axially through said heating drum and having its respective ends supported by said tilting frame and fixed against rotation and having a burner at the rearward end, and a fire flue stack of lesser diameter than that of said main stack and fixed to the forward end of said fire flue and projecting slightly into the lower portion of said main stack to form an annular passage between the upper end of said fire flue stack and the lower end of said main stack with the fire flue stack functioning as an injector for discharging fumes from within said hopper through said annular passage and thence out through said main stack, and with said fire flue stack located entirely within said feed hopper for initial heating of road patching material therein, a discharge hopper and spreader pan depending from the rear end of said main frame for receiving the treated material from the rear end of said heating drum with the bottom clearing the support surface for the vehicle, and adjusting means cooperative between said main frame and said tilting frame and operable at will for adjusting the inclination of said heating drum relative to said main frame for controlling the rate of passage of material through said heating drum and coincidently the degree of heating.

6. A road patching machine comprising, a heating drum and a burner therefor, a feed hopper having a feed opening and a discharge opening, means for heating material in said hopper and for discharging fumes from the hopper comprising, a main stack extending upwardly from the top of said feed hopper, a fire flue stack extending from said heating drum upwardly through said feed hopper with the upper end of the fire flue stack terminating within the lower end of said main stack and annularly spaced therefrom to function as an injector for discharging fumes from within the hopper through the annular space between said main stack and the terminal portion of said fire flue stack and thence out through the main stack to prevent subjection of workers to the escape of fumes through the feed opening provided through the front of the hopper.

References Cited in the file of this patent
UNITED STATES PATENTS

| Number | Name | Date |
| --- | --- | --- |
| Re. 16,265 | Harty et al. | Feb. 16, 1926 |
| 46,287 | White | Feb. 7, 1865 |
| 623,775 | Fey | Apr. 25, 1899 |
| 1,350,502 | Hetherington | Aug. 24, 1920 |
| 1,546,185 | Andresen | July 14, 1925 |
| 1,820,297 | Butler | Aug. 25, 1931 |
| 1,965,881 | Clark et al. | July 10, 1934 |
| 2,257,637 | Moore | Sept. 30, 1941 |
| 2,265,358 | Denning | Dec. 9, 1941 |